(12) United States Patent
Levy et al.

(10) Patent No.: US 10,498,612 B2
(45) Date of Patent: *Dec. 3, 2019

(54) MULTI-STAGE SELECTIVE MIRRORING

(71) Applicant: Mellanox Technologies TLV Ltd., Raanana (IL)

(72) Inventors: Gil Levy, Hod Hasharon (IL); Lion Levi, Yavne (IL); George Elias, Tel Aviv (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 384 days.

This patent is subject to a terminal disclaimer.

(21) Appl. No.: 15/390,560

(22) Filed: Dec. 26, 2016

(65) Prior Publication Data

US 2018/0091388 A1 Mar. 29, 2018

Related U.S. Application Data

(63) Continuation-in-part of application No. 15/276,823, filed on Sep. 27, 2016.

(51) Int. Cl.
*H04L 12/26* (2006.01)
*H04L 29/08* (2006.01)
(Continued)

(52) U.S. Cl.
CPC ........ *H04L 43/028* (2013.01); *H04L 41/0213* (2013.01); *H04L 43/026* (2013.01);
(Continued)

(58) Field of Classification Search
CPC ... H04L 43/022; H04L 43/024; H04L 43/026; H04L 43/04; H04L 47/2441; H04L 47/2483; H04L 47/30; H04L 47/31
See application file for complete search history.

(56) References Cited

U.S. PATENT DOCUMENTS 7,031,304 B1 4/2006 Arberg et al.
7,292,573 B2 11/2007 Lavigne et al.
(Continued)

OTHER PUBLICATIONS

Levi et al., U.S. Appl. No. 15/276,823, filed Sep. 27, 2016.
(Continued)

*Primary Examiner* — George C Neurauter, Jr.
(74) *Attorney, Agent, or Firm* — Kligler & Associates

(57) ABSTRACT

Communication apparatus includes multiple interfaces connected to a packet data network and at least one memory configured as a buffer to contain packets received through the ingress interfaces while awaiting transmission to the network via respective egress interfaces. Processing circuitry is configured to identify data flows to which the data packets that are received through the ingress interfaces belong, to assess respective bandwidth characteristics of the data flows, and to select one or more of the data flows as candidate flows for mirroring responsively to the respective bandwidth characteristics. The processing circuitry selects, responsively to one or more predefined mirroring criteria, one or more of the data packets in the candidate flows for analysis by a network manager, and sends the selected data packets to the network manager over the network via one of the egress interfaces.

19 Claims, 3 Drawing Sheets

(51) Int. Cl.
  *H04L 12/24* (2006.01)
  *H04L 12/835* (2013.01)
  *H04L 12/851* (2013.01)
  *H04L 12/833* (2013.01)

(52) U.S. Cl.
  CPC .............. *H04L 43/04* (2013.01); *H04L 43/12* (2013.01); *H04L 47/2441* (2013.01); *H04L 47/2483* (2013.01); *H04L 47/30* (2013.01); *H04L 47/31* (2013.01); *H04L 67/1095* (2013.01); *H04L 43/0852* (2013.01); *H04L 43/0894* (2013.01); *Y02D 50/30* (2018.01)

(56) References Cited

U.S. PATENT DOCUMENTS

| | | | | |
|---|---|---|---|---|
| 8,204,958 | B2* | 6/2012 | Oliynyk | H04L 43/026 370/252 |
| 8,787,176 | B2 | 7/2014 | Ford et al. | |
| 8,819,213 | B2 | 8/2014 | Frattura et al. | |
| 9,172,627 | B2* | 10/2015 | Kjendal | H04L 43/028 |
| 9,369,366 | B2* | 6/2016 | Richards | H04L 47/10 |
| 9,529,621 | B2* | 12/2016 | Richards | H04L 47/10 |
| 9,584,393 | B2* | 2/2017 | Kjendal | H04L 43/12 |
| 9,716,661 | B2* | 7/2017 | Aybay | H04L 47/2441 |
| 9,955,023 | B2* | 4/2018 | Richards | H04L 47/10 |
| 10,212,224 | B2* | 2/2019 | Kjendal | H04L 43/028 |
| 2001/0055274 | A1 | 12/2001 | Hegge et al. | |
| 2002/0161914 | A1 | 10/2002 | Belenki | |
| 2005/0141423 | A1* | 6/2005 | Lee | H04L 41/0896 370/232 |
| 2005/0220092 | A1* | 10/2005 | LaVigne | H04L 43/028 370/389 |
| 2006/0059163 | A1* | 3/2006 | Frattura | H04L 12/4633 |
| 2006/0143300 | A1* | 6/2006 | See | H04L 43/026 709/227 |
| 2007/0056028 | A1* | 3/2007 | Kay | H04L 63/1416 726/11 |
| 2007/0058632 | A1* | 3/2007 | Back | H04L 43/00 370/392 |
| 2011/0191414 | A1 | 8/2011 | Ma et al. | |
| 2012/0233349 | A1* | 9/2012 | Aybay | H04L 47/2441 709/234 |
| 2013/0088969 | A1 | 4/2013 | Mukherjee et al. | |
| 2014/0098822 | A1 | 4/2014 | Galles et al. | |
| 2014/0136723 | A1* | 5/2014 | Branson | H04L 67/322 709/231 |
| 2014/0192646 | A1* | 7/2014 | Mir | H04L 43/0829 370/235 |
| 2014/0280829 | A1 | 9/2014 | Kjendal et al. | |
| 2014/0280889 | A1* | 9/2014 | Nispel | H04L 43/04 709/224 |
| 2015/0089045 | A1* | 3/2015 | Agarwal | H04L 43/04 709/224 |
| 2015/0113132 | A1 | 4/2015 | Srinivas et al. | |
| 2015/0271081 | A1* | 9/2015 | Arumilli | H04L 47/11 370/235 |
| 2016/0050150 | A1* | 2/2016 | Venkatesan | H04L 49/25 370/236 |
| 2016/0134563 | A1 | 5/2016 | Yu et al. | |
| 2016/0301632 | A1 | 10/2016 | Anand et al. | |
| 2018/0183724 | A1* | 6/2018 | Callard | H04L 41/08 |

OTHER PUBLICATIONS

U.S. Appl. No. 15/276,823 office action dated Apr. 25, 2018.
U.S. Appl. No. 15/276,823 office action dated Dec. 20, 2018.
U.S. Appl. No. 15/276,823 office action dated May 2, 2019.

* cited by examiner

MULTI-STAGE SELECTIVE MIRRORING

CROSS-REFERENCE TO RELATED APPLICATION

This application is a continuation-in-part of U.S. patent application Ser. No. 15/276,823, filed Sep. 27, 2016, which is incorporated herein by reference.

FIELD OF THE INVENTION

Embodiments described herein relate generally to communication networks, and particularly to methods and apparatus for network monitoring using selective mirroring.

BACKGROUND

Communication networks may be monitored for various purposes such as network management, security, collection of statistical information on network behavior, and debugging. The network can be monitored using various techniques. For example, in port mirroring, packets seen on a switch or a router port are copied and, typically, sent to a central network management appliance.

Methods for network monitoring using mirroring are known in the art. For example, U.S. Patent Application Publication 2014/0280829 describes a function that is provided in a network system for the dynamic mirroring of network traffic for a variety of purposes including the identification of characteristics of the traffic. Multiple criteria are established for when, what and where to mirror the traffic. The criteria include what frames of traffic to mirror, what portions of the selected frames to mirror, one or more portals through which to mirror the selected frames, a destination for the mirroring and the establishment of a mirror in a device to carry out the mirroring. The mirroring instructions can be changed based on the detection of a triggering event, such as authentication, device type or status, ownership of an attached function attached to the device, or flow status.

U.S. Pat. No. 8,819,213 describes a method and systems for dynamically mirroring network traffic. The mirroring of network traffic may comprise data that may be considered of particular interest. The network traffic may be mirrored by a mirror service portal from a mirror sender, referred to as a mirror source, to a mirror receiver, referred to as a mirror destination, locally or remotely over various network segments, such as private and public networks and the Internet. The network traffic may be mirrored to locations not involved in the network communications being mirrored.

U.S. Pat. No. 7,292,573 describes a method for mirroring of select network traffic. A data packet is received by a network device. A determination is made as to whether a designated aspect of the packet matches a flagged entry in a look-up table on the network device. If a match is found, then a copy of the packet is sent to an associated mirror destination.

SUMMARY

Embodiments of the present invention that are described hereinbelow provide improved methods and apparatus for selective mirroring of data packets.

There is therefore provided, in accordance with an embodiment of the invention, communication apparatus, including multiple interfaces configured to be connected to a packet data network so as to serve as ingress and egress interfaces in receiving and forwarding of data packets from and to the network by the apparatus. At least one memory is coupled to the interfaces and configured as a buffer to contain packets received through the ingress interfaces while awaiting transmission to the network via respective ones of the egress interfaces. Processing circuitry is configured to identify data flows to which the data packets that are received through the ingress interfaces belong, to assess respective bandwidth characteristics of the data flows, and to select one or more of the data flows as candidate flows for mirroring responsively to the respective bandwidth characteristics, and is further configured to select, responsively to one or more predefined mirroring criteria, one or more of the data packets in the candidate flows for analysis by a network manager, and to send the selected data packets to the network manager over the network via one of the egress interfaces.

In the disclosed embodiments, the processing circuitry is configured to mirror the data packets only from the candidate flows, while the data packets in the data flows that were not selected as candidate flows are not mirrored. Typically, none of the data packets in the candidate flows are sent to the network manager when the mirroring criteria are not satisfied.

In some embodiments, the processing circuitry is configured to select the data flows that consume respective bandwidths in excess of a specified threshold as the candidate flows, while the data flows that consume respective bandwidths less than the specified threshold are not selected.

Additionally or alternatively, the processing circuitry is configured to label the data packets in the candidate flows as candidates for mirroring upon receipt of the data packets through the ingress interfaces, before queuing the data packets in the buffer, and to select the data packets for analysis from among the labeled data packets that are held in the buffer.

In a disclosed embodiment, the one or more predefined mirroring criteria include a plurality of mirroring criteria, and the processing circuitry is configured to label the data packets in the candidate flows so as to indicate which of the mirroring criteria are applicable to each of the labeled data packets, and to select a given data packet for mirroring in response to a given mirroring criterion only when the given data packet is labeled to indicate that the given mirroring criterion is applicable to the given data packet.

Additionally or alternatively, the processing circuitry is configured to select one or more further candidate flows responsively to values of one or more fields in a header of the data packets.

In some embodiments, the processing circuitry is configured monitor a respective buffering parameter of the data packets in the candidate flows that have been queued in the buffer while awaiting transmission via the egress interfaces, and to select the one or more of the data packets for mirroring based on the respective buffering parameter. The buffering parameter typically specifies at least one transmission characteristic of the candidate flows, selected from a group of transmission characteristics consisting of a degradation in quality of service, a level of buffer usage, a queue length, a packet transmission latency, and a congestion state.

There is also provided, in accordance with an embodiment of the invention, communication apparatus, including multiple interfaces configured to be connected to a packet data network so as to serve as ingress and egress interfaces in receiving and forwarding of data packets from and to the network by the apparatus. At least one memory is coupled to the interfaces and configured as a buffer to contain packets received through the ingress interfaces while awaiting transmission to the network via respective ones of the egress interfaces. Processing circuitry is configured to identify data flows to which the data packets that are received through the ingress interfaces belong, to select and label one or more of the data flows as candidate flows for mirroring upon receipt of the data packets through the ingress interfaces and before queuing the data packets in the buffer, and is further configured to select for analysis by a network manager, responsively to one or more predefined mirroring criteria, one or more of the data packets in the candidate flows from among the data packets that are held in the buffer, and to send the selected data packets to the network manager over the network via one of the egress interfaces.

In some embodiments, the one or more predefined mirroring criteria include a plurality of mirroring criteria, and the processing circuitry is configured to label the data packets in the candidate flows so as to indicate which of the mirroring criteria are applicable to each of the labeled data packets, and to select a given data packet for mirroring in response to a given mirroring criterion only when the given data packet is labeled to indicate that the given mirroring criterion is applicable to the given data packet. Typically, none of the data packets in a given candidate flow are sent to the network manager when the mirroring criterion applicable to the given candidate flow is not satisfied. Additionally or alternatively, the processing circuitry is configured to mirror the data packets only from the candidate flows, while the data packets in the data flows that were not selected as candidate flows are not mirrored.

There is additionally provided, in accordance with an embodiment of the invention, a method for communication, which includes receiving and forwarding of data packets from and to a packet data network via ingress and egress interfaces of a network element. Data flows to which the data packets that are received through the ingress interface belong are identified, and respective bandwidth characteristics of the data flows are assessed. One or more of the data flows are selected as candidate flows for mirroring responsively to the respective bandwidth characteristics. Responsively to one or more predefined mirroring criteria, one or more of the data packets in the candidate flows are selected for analysis by a network manager and are sent to the network manager over the network via one of the egress interfaces.

There is further provided, in accordance with an embodiment of the invention, communication apparatus, including multiple interfaces configured to be connected to a packet data network so as to serve as ingress and egress interfaces in receiving and forwarding of data packets from and to the network by the apparatus. At least one memory is coupled to the interfaces and configured as a buffer to contain packets received through the ingress interfaces while awaiting transmission to the network via respective ones of the egress interfaces. Processing circuitry is configured to identify data flows to which the data packets that are received through the ingress interfaces belong, to assess respective bandwidth characteristics of the data flows, to select the data flows that consume respective bandwidths in excess of a specified threshold as candidate flows for mirroring to a network manager, and to send data packets from the candidate flows to the network manager over the network via one of the egress interfaces.

In some embodiments, the data flows that consume respective bandwidths less than the specified threshold are not selected for mirroring.

The present invention will be more fully understood from the following detailed description of the embodiments thereof, taken together with the drawings in which:

DETAILED DESCRIPTION OF EMBODIMENTS

Overview

Figure 1:
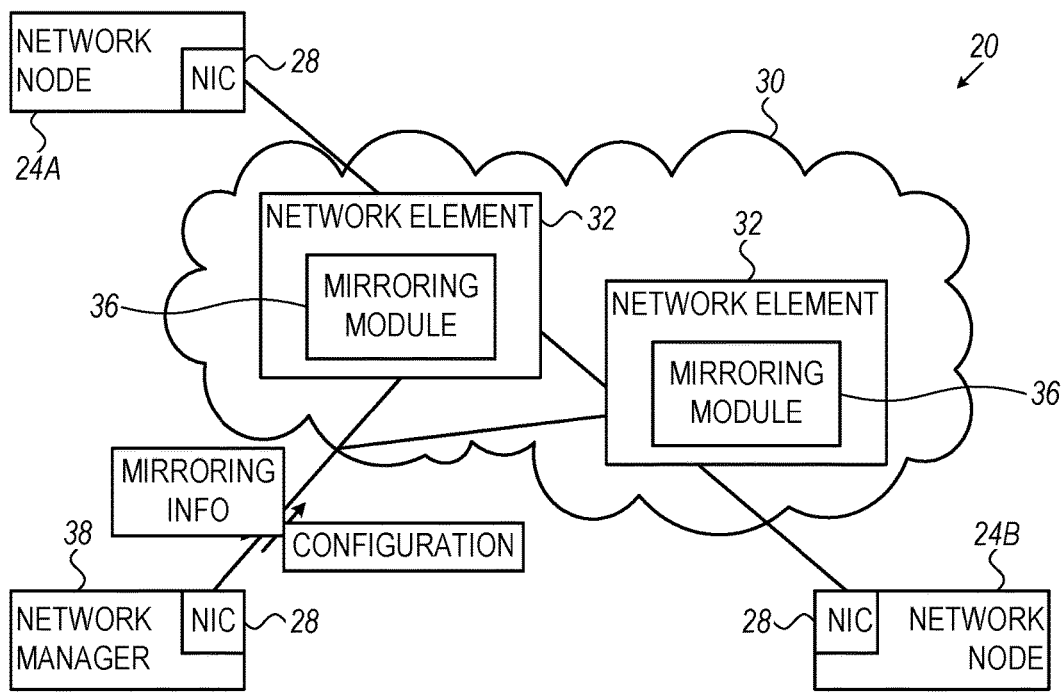
FIG. 1 is a block diagram that schematically illustrates a computer system, in accordance with an embodiment that is described herein.

Packet communication networks are commonly managed using a central network manager. To maintain optimal performance, the network is typically monitored by several network elements, each of which reports its local state to the network manager. Based on the reported information, the network manager identifies bottlenecks and other problems in the network behavior and reports them to a network administrator, who can reconfigures the network to resolve the problems detected, thus enhancing network performance. The network manager may also adapt at least part of the network configuration automatically.

One approach for monitoring the network is to send some of the packets traversing a network element, e.g., a switch, router or network interface controller (NIC), from the network element to the network manager, in addition to their intended destination. This sort of duplicate packet delivery is referred to as "mirroring," and a packet sent to the network manager is also referred to as a "mirrored packet."

Typically, the network administrator configures the network elements (e.g., switches or routers) to mirror packets that meet certain criteria. For example, a mirroring criterion may specify mirroring packets that are received from the network via a given ingress interface and/or delivered to the network via a given egress interface of the network element. Alternatively or additionally, the mirroring criterion may specify packets that are associated with a given Virtual LAN (VLAN). Further alternatively or additionally, the criterion may require mirroring packets based on certain fields in the packet headers, such as source and destination addresses, source and destination ports, and the underlying protocol used.

A mirroring approach in which the mirroring criteria are insensitive to conditions that may be evolving within the switch due to the actual network traffic typically suffers from several disadvantages:

- The scalability of such a solution is poor because the network can be flooded with large numbers of mirrored packets, which require network resources and interfere with user data delivery.
- The network manager is overwhelmed with a large number of mirrored packets, while only a small subset of these packets may be indicative of actual network problems.

To control the bandwidth consumed by the mirrored packets, only a partial subset of the packets that pass the mirroring criterion may be sampled and sent to the network manager. As a result, some packets that are valuable for identifying network problems may fail to be mirrored.

The above-mentioned U.S. patent application Ser. No. 15/276,823 describes methods and systems in which the packets traversing a network element are associated with respective data flows, and are mirrored selectively based on a buffering parameter of the data flows. Such mirroring may be triggered, for example, when buffer conditions show congestion or when packet transmission times indicate that transmission latency has risen above a certain threshold.

In the context of the present patent application and in the claims, the term "data flow" (also referred to as "flow" for brevity) refers to a sequence of packets, which transfer application data between a pair of end-nodes, i.e., from a given source node to a given destination node. Packets belonging to a particular flow may be identified, for example, as having the same 5-tuple values (source and destination addresses, source and destination ports, and protocol) and being transmitted within no more than a specified time interval between successive packets in the sequence.

The approach described in the above-mentioned U.S. patent application Ser. No. 15/276,823 is advantageous in assisting the network manager in diagnosing congestion issues, but can still load the network manager with large volumes of information that may not be directly relevant to such issues. To check congestion conditions on a particular flow, for example, the network manager may first have to filter out large numbers of mirrored packets on other flows that have also been affected by the congestion. These unneeded mirrored packets increase traffic load on the network and thus can exacerbate the very problems that the network manager is trying to solve.

Embodiments of the present invention that are described herein address these problems by dividing the mirroring process into two stages:

In the first stage, processing circuitry in a switch or other network element classifies data packets that are received through the ingress interface according to the data flows to which the packets belong, and selects and labels the data flow or flows that are candidates for mirroring. This stage takes place upon receipt of the data packets through the ingress interfaces and before queuing the data packets in the buffer, and enables only certain candidate flows for subsequent mirroring.

In the second stage, after the packets have been buffered, the processing circuitry selects one or more of the data packets in the candidate flows for analysis by a network manager, based upon one or more predefined mirroring criteria, and sends these selected data packets to the network manager over the network via one of the egress interfaces. The selection of packets in this second stage may be based on the buffering parameters (such as congestion and latency) that are described in U.S. patent application Ser. No. 15/276,823, or additionally or alternatively, on any other sorts of mirroring criteria that are known in the art.

The processing circuitry will thus mirror data packets only from the candidate flows, while data packets in other flows that were not selected as candidate flows are not enabled for mirroring.

Multiple different mirroring criteria can be applied in the second stage. Therefore, in some embodiments, the processing circuitry labels the data packets in the candidate flows in the first stage so as to indicate which of the mirroring criteria are applicable to each of the labeled data packets. As a result, in the second stage, the processing circuitry will select a given data packet for mirroring based on a given mirroring criterion only when the given data packet is labeled to indicate that this sort of mirroring criterion is applicable. None of the data packets in a given candidate flow are sent to the network manager when the particular mirroring criterion or criteria applicable to the given candidate flow are not satisfied.

In some embodiments, the processing circuitry identifies data flows to which the data packets that are received through the ingress interfaces belong, assesses respective bandwidth characteristics of the data flows, and selects the candidate flows for mirroring based on the respective bandwidth characteristics. For example, the processing circuitry can select as candidates data flows that consume respective bandwidths in excess of a specified threshold as candidate flows, while data flows that consume smaller bandwidths are not selected. (The high-bandwidth flows are commonly referred to as "elephant" flows.) The processor will then preferentially select data packets from these high-bandwidth candidate flows for mirroring to the network manager, thus enabling the network manager to focus its analysis on flows that are the likeliest to be causing congestion. This combination of "elephant detection" with mirroring selection is particularly well suited to the two-stage mirroring architecture that is described above, but it can also be implemented in other sorts of network element configurations. Furthermore, the selection of candidate flows need not be limited to elephant flows, and the processing circuitry may select other candidate flows based on other criteria, such as values of one or more fields in the packet headers, for example.

For the sake of concreteness and clarity, the embodiments that are shown in the figures and described in detail hereinbelow present example implementations of packet mirroring techniques in a high-speed switch, operating in a certain network environment. Alternatively, the principles of the present invention may be implemented, mutatis mutandis, in other sorts of network elements, such as a network interface controller (NIC) or host computer. All such embodiments are considered to be within the scope of the present invention.

System Description

FIG. 1 is block diagram that schematically illustrates a computer system 20, in accordance with an embodiment that is described herein. System 20 comprises multiple host computers 24, which communicate with one another over a network 30 and thus function as nodes of the network. These network nodes connect to network 30 via respective network interface controllers (NICs) 28. Although in the example of FIG. 1, the computer system comprises two host computers 24A and 24B, a practical computer system may comprise any suitable number of network nodes.

Network 30 may comprise any suitable sort of communication network such as, for example, an InfiniBand (IB) switch fabric, or packet networks of other sorts, such as Ethernet or Internet Protocol (IP) networks. Alternatively, network 30 may operate in accordance with any other suitable standard or protocol. Network 30 typically comprises multiple network elements, such as switches 32, which are interconnected by communication links. Alternatively or additionally, the network elements in network 30 may comprise, for example, routers, bridges, and/or gateways.

Network 30 is managed using a central network manager 38, for example, a host computer with suitable software for this purpose, which connects to the network via its own NIC 28. The network manager enables a network administrator to set up the network and provision switches 32 and other network elements. Network manager 38 additionally receives from the network elements information to be used for fault analysis, as well as for detecting various problems such as bottlenecks and congestion conditions across the network. Network manager 38 analyzes the received information in order to provide the network administrator with an organized view of network performance. The administrator can then optimize the network performance by reconfiguring the network elements accordingly. Alternatively or additionally, the network manager derives and applies at least part of the reconfiguration automatically. Based on mirrored packets that are sent to network manager 38, the network manager can also generate new mirroring rules that focus on the suspicious data flows.

In computer system 20, network manager 38 monitors network 30 using mirroring techniques in which switches 32 (and possibly other network elements, not shown in the figures) send selected packets to the network manager for analysis. For this purpose, switches 32 comprise a mirroring module 36, which selectively mirrors packets for analysis by the network manager based on various criteria, as will be described in greater detail below. In some embodiments the network elements send to the network manager, along with the mirrored packets, metadata information that further assists the network manager in determining the root reasons that cause suboptimal performance and the flows contributing to the degraded performance.

Although in computer system 20, as shown in FIG. 1, network manager 38 is implemented on a dedicated network node, in alternative embodiments, the network manager can be implemented in software running on one or more of host computers 24, and executed by a processor of the host computer.

Figure 2:
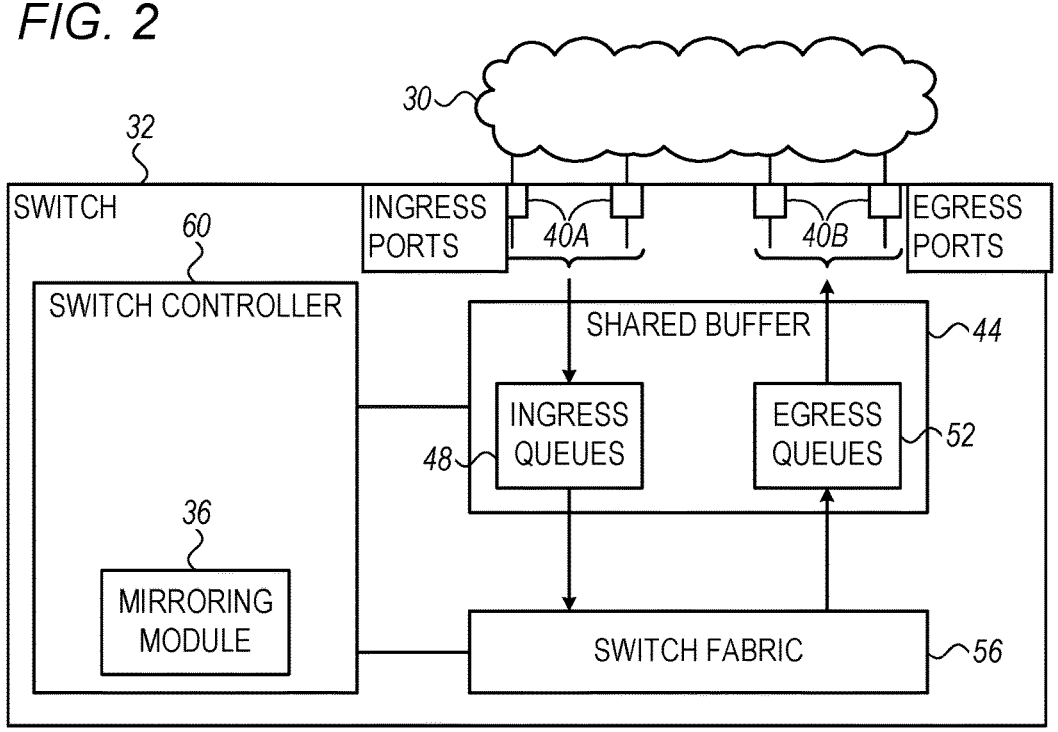
FIG. 2 is a block diagram that schematically illustrates a network element that applies selective mirroring, in accordance with an embodiment that is described herein.

FIG. 2 is a block diagram that schematically illustrates a network switch 32, which applies selective mirroring in accordance with an embodiment that is described herein. Although the description that follows refers mainly to this network switch, the disclosed techniques can be applied in various other types of network elements.

Switch 32 comprises multiple ports 40, which serve as ingress and egress interfaces in receiving and forwarding of data packets from and to network 30. In some embodiments, a given port 40 can function as an ingress interface for incoming packets or as an egress interface for outputting packets. Alternatively, ports 40 can function as both ingress and egress interfaces. In the present example, for simplicity and clarity, certain ports serve as ingress interfaces 40A, while other ports serve as egress interfaces 40B. Although interfaces 40A and 40B are identified in this embodiment as switch ports, the principles of the present invention may similarly be applied to packets traversing other sorts of ingress and egress interfaces, such as router interfaces or tunnel interfaces, for example.

Switch 32 comprises at least one memory, which is coupled to ports 40 and serves as a buffer 44 to contain packets received through the ingress interfaces while awaiting transmission to the network via respective egress interfaces. In the pictured embodiment, buffer 44 is configured as a shared buffer and also manages various aspects of allocating buffering resources. As such, the shared buffer supports counting packets or bytes at the ingress and priority levels or at an egress level. The shared buffer also supports aggregating counts of the same or different types.

In the present example, buffer 44 comprises one or more ingress queues 48 for storing packets arriving from the network via ingress interfaces 40A, and one or more egress queues 52 for storing packets awaiting transmission to the network via egress interfaces 40B. In buffer 44, queues of different sizes may be dynamically allocated to different data flows or to different ingress or egress interfaces. Using a shared buffer is advantageous over using a conventional buffer with static queue allocation, for example, in handling and absorbing flow microbursts. (A flow microburst is a condition in which a large number of flows are simultaneously destined for transmission via a common egress interface of the switch.) Using a shared buffer for queueing the packets is not mandatory for using the disclosed techniques, however, and in alternative embodiments, other buffer architectures can also be used.

Switch 32 further comprises a configurable switch fabric 56, which forwards packets between ingress interfaces 40A and egress interfaces 40B, via the respective queues 48 and 52, in accordance with a predefined routing plan. Typically, each packet belongs to a certain flow, as defined above. By routing a certain flow to a certain port, fabric 56 causes the packets of that flow to be delivered over a certain routing path through network 30. Thus, each flow is typically assigned a certain routing path at any given time, and all the packets of the flow are routed by fabric 56 over that routing path. Switch 32 typically routes multiple flows simultaneously.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Switch 32 comprises a switch controller 60, which is a part of the processing circuitry in the switch and performs the various management tasks and some of the packet processing functions of the switch. For example, switch controller 60 configures fabric 56 to apply the desired routing plan. By controlling the routing plan, switch 32 is able to cause the packets to traverse various routing paths through network 30. In some embodiments, switch controller 60 re-routes a given flow in response to receiving a re-configuration request from network manager 38, e.g., when the flow in question is found to be congested by the switch, the network manager or both.

To re-route a given flow, switch controller 60 selects a different egress interface for the packets in the flow, which the switch receives via a given ingress interface. Switch 32 may, for example, save the current associations between ingress and egress interfaces in a Forwarding Database (FDB) (not shown in the figure). Alternatively, switch 32 can hold a set of routing rules, e.g., per flow.

Forwarding the packets is typically based on certain fields in the packet headers. The fields may include, for example, one or more of the 5-tuple fields (source address, destination address, underlying protocol, source port number and destination port number). In some embodiments, the switch controller calculates a hash function over one or more fields in the packet headers, and uses the resulting hash value in selecting a respective egress interface for the packet.

Mirroring module 36 implements the decision-making and sampling parts of the port mirroring capabilities of the switch, and is comprised within switch controller 60. Mirroring module 36 selects packets in data flows that should be monitored based on various criteria, as will be described in detail below. The mirroring module samples packets from these data flows and sends the sampled packets to network manager 38 via an egress interface 40B of the switch. The egress interface that is used for mirroring may be used exclusively for sending mirrored packets, or it can also be used for sending data flow packets.

Implementation of Selective Mirroring

Figure 3:
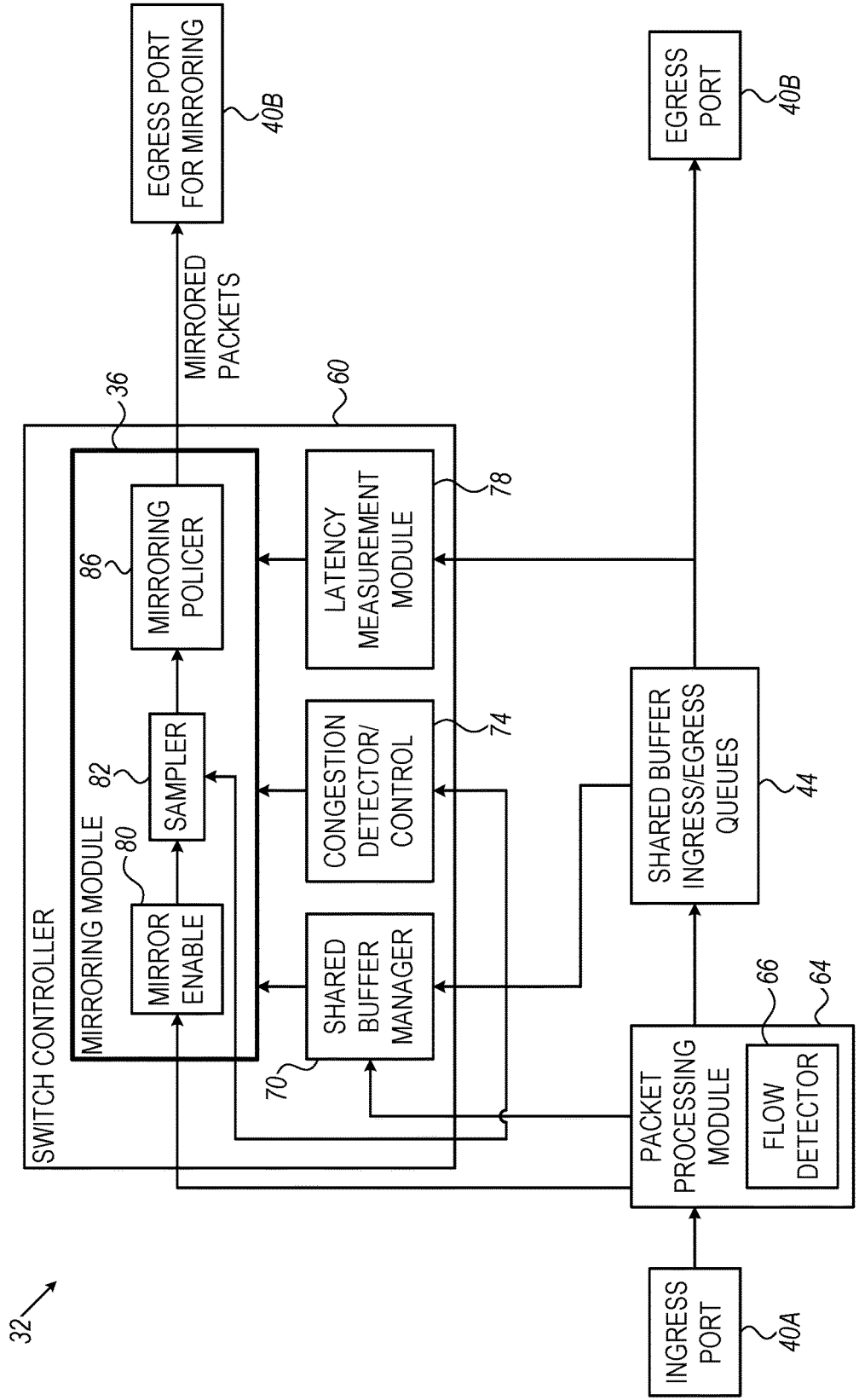
FIG. 3 is a block diagram that schematically illustrates a switch controller that manages packet mirroring, in accordance with an embodiment that is described herein.

FIG. 3 is a block diagram that schematically shows details of switch controller 60 and other components of switch 32 that are involved in packet mirroring, in accordance with an embodiment of the present invention. Switch controller 60 is a part of the processing circuitry in switch 32 that implements the mirroring functions that are described herein, together with a packet processing module 64. This processing circuitry typically comprises hardware logic, which is configured to carry out the functions that are described herein. The logic may be hard-wired or programmable, for example in the form of a suitable gate array. Alternatively, at least some of the functions of the processing circuitry may be carried out by an embedded microprocessor in switch 32, operating under the control of suitable software or firmware. All such implementations are considered to be within the scope of the present invention.

In FIG. 3, switch controller 60 monitors data flows traversing switch 32. Packets arriving from the network via ingress interface 40A are first processed by packet processing module 64. In the present embodiment, packet processing module 64 performs these functions upon receipt of the data packets through ingress interfaces 40A and before queuing the data packets in buffer 44. The processing functions applied by packet processing module 64 include, for example, verifying the correctness of the data in the packet payload, packet classification and prioritization, routing, and access control lists (ACL). For these purposes, the packet processing module typically checks certain fields in the packets headers, such as the source and destination addresses and port numbers and the underlying network protocol.

In addition, packet processing module 64 comprises a flow detector 66, which assesses respective bandwidth characteristics of the data flows entering switch 32. Flow detector 66 measures the volume of each flow and is thus able to identify high-bandwidth "elephant flows." In the present embodiment, packet processing module 64 can label these high-bandwidth flows as candidate flows for mirroring. Additionally or alternatively, the flow information provided by flow detector 66 can be used for other purposes, such as selective application of congestion control.

Switch 32 typically temporarily stores packets for which there is no available egress queue or whose processing has not yet completed in ingress queues 48 of shared buffer 44. Switch 32 stores packets whose routing has been resolved and are awaiting transmission in egress queues 52 of the shared buffer.

For managing the mirroring functions of switch 32, mirroring module 36 receives inputs from several modules that monitor the data flows traversing the switch, including packet processing module 64, as well as a shared buffer manager 70, a congestion detector 74 and a latency measurement module 78. Congestion detector 74 is typically part of a module that applies congestion control methods and/or admission control methods to the data packets that are held in buffer 44. Congestion control is used in regulating traffic injection into the network. Admission control is used in regulating the number of users in the system for which a required quality of service can be satisfied.

Shared buffer manager 70 reports the level of buffer usage of shared buffer 44 to mirroring module 36. The level of buffer usage can be measured for individual ingress and egress interfaces. In this case the buffer usage level specifies the amount of storage consumed by the data flows traversing the interface in question. Alternatively or additionally, the buffer usage level can be measured for a group of multiple aggregated ingress and/or egress interfaces. In this latter case, the buffer level usage specifies the amount of storage consumed by individual data flows traversing the interfaces in the group. Additionally, shared buffer manager 70 reports to mirroring module 36 queue length values measured for individual queues or to groups of queues in the shared buffer. A high level of buffer usage or a high value of queue length may be used to predict an imminent congestion condition or some other problem in the network. Similarly, an excessive queue length may indicate an imminent microburst.

In the example of FIG. 3, shared buffer manager 70 reports levels of buffer usage and queue length values to mirroring module 36. The mirroring module detects excessive buffer usage levels by comparing the reported buffer usage levels to respective predefined usage level thresholds. Similarly, the mirroring module detects excessive queue length values, by comparing the reported queue length values to respective predefined queue length thresholds.

Congestion detector 74 applies one or more congestion control methods. Congestion detector 74 may apply any suitable congestion control method, such as Explicit Congestion Notification (ECN), Controlled Delay (CoDel), or detecting congestion using Phantom Queues (PQ), for example. Alternatively or additionally, detector 74 may apply admission control methods such as tail drop or Weighted Random Early Detection (WRED). The congestion detector reports to mirroring module 36 when detecting a congestion condition (or an impending congestion condition). In some embodiments, congestion detector 74 reports to the mirroring module the identities of the congested data flows.

Latency measurement module 78 measures, for each packet individually (over all packets or certain selected packets), packet latency between pairs of ingress and egress interfaces. A long latency may indicate, for example, faults in queue arbitration or heavily occupied queues that delay packet flow within the switch. Latency measurement module 78 typically reports statistical information regarding packet latencies to mirroring module 36. For example, in one embodiment, module 78 reports to the mirroring module minimum, maximum and/or average latency values between the ingress packets and respective egress packets. Alternatively or additionally, module 78 reports to the mirroring module histograms of the packet latencies. While the latency measurement module provides general information (statistics) related to latency, however, mirroring module 36 itself applies only per-packet latency in choosing packets to mirror.

Mirroring module 36 receives reports from packet processing module 64, shared buffer 70, congestion detector and latency measurement module 78, and uses these reports to select packets for mirroring. Specifically, in the present embodiment, packet processing module 64 signals a mirror enabler 80 in mirroring module 36 to select and label certain data flows as candidate flows for mirroring. The selection can be based on bandwidth characteristics measured by flow detector 66. Additionally or alternatively, packet processing module 64 can signal mirror enabler 80 to label candidate flows based on other criteria, such as the values of one or more header fields, including fields in the packet 5-tuple and/or fields relating to quality of service. In some embodiments, mirror enabler 80 labels the data packets in the candidate flows to indicate which of the mirroring criteria are applicable to each of the labeled data packets, for example by setting bits of an enablement vector, with each bit referring to a different, predefined mirroring criterion. These criteria and the vector that encodes them can typically be configured by network manager 38.

A sampler 82 in mirroring module 36 selects data packets to be mirrored from among the packets that packet processing module 64 has placed in buffer 44. Sampler 82 selects these packets by applying predefined mirroring criteria to the packets in the flows that have been labeled as candidates for mirroring by mirror enabler 80. As noted earlier, sampler 82 may apply multiple different criteria in choosing packets to be mirrored. When enabler 80 sets elements of a vector of mirroring criteria for each flow, sampler will, in any given flow, apply only the specific mirroring criterion or criteria that are enabled for that flow.

In some embodiments, for example, sampler 82 selects packets from candidate flows for which shared buffer manager 70 reports excessive levels of buffer usage and/or excessive queue lengths. Additionally or alternatively, sampler 82 selects packets from candidate flows that are reported as congested by congestion detector 74. Further additionally or alternatively, sampler 82 selects packets from candidate flows in which a statistical property of the packet latencies, as reported by latency measurement module 78, exceeds a predefined latency threshold. The above criteria can be detected and measured in terms of the values of corresponding buffering parameters of the data packets in the candidate flows that have been queued in buffer 44 while awaiting transmission through egress interfaces 40B. Such buffering parameters can characterize, for example, a degradation in quality of service, a level of buffer usage, a queue length, a packet transmission latency, or a congestion state. When multiple mirroring criteria are used, sampler 82 may apply a different sampling rate for each of the criteria, meaning that different percentages of the packets satisfying the different mirroring criteria are selected (possibly including, in some cases, 100% of the packets that meet a certain mirroring criterion).

Further additionally or alternatively, sampler 82 may select packets for mirroring based on other criteria, which are not necessarily related to buffering parameters. For example, packets to be mirrored may be selected on the basis of their encapsulation or forwarding information. As noted above, however, sampler 82 will typically select packets only from the candidate flows designated by enabler 80, while ignoring the data flows that were not selected as candidate flows. At the same time, designation of a flow as a candidate does not guarantee that packets from the flow will be mirrored; and sampler 82 may not select any of the data packets in a given candidate flow for mirroring when the mirroring criteria enabled for the given flow are not satisfied.

Sampler 82 typically samples packets from the identified data flows according to a predefined sampling scheme. For example, in one embodiment, sampler 82 samples a given data flow by selecting one packet out of N consecutive packets of the data flow, wherein N is a configurable positive integer. Alternatively, sampler 82 can sample the given data flow periodically at predefined time intervals.

A mirroring policer 86 receives the packets selected by sampler 82, and may discard one or more of these packets according to a predefined policy. Policer 86 sends each sampled packet that has not been discarded to network manager 38 via a mirroring interface 40B, which is typically an egress port different from the egress port (or ports) through which the packet is forwarded to its intended destination. Policer 86 may apply any suitable policy for discarding packets so as to hold the amount of traffic sent to network manager 38 below a suitable limit, which may be configured by the network manager. As in the case of sampler 82, policer 86 may apply different policies to packets that have been selected for mirroring based on different criteria. On the other hand, policer 86 may be set simply to pass through all sampled packets to network manager 38.

The network and switch configurations shown in FIGS. 1, 2 and 3 are example configurations, which are chosen purely for the sake of conceptual clarity. In alternative embodiments, any other suitable network and/or switch configurations can be used. For example, although the embodiments described herein refer mainly to switches, the disclosed techniques can be implemented in various other types of network elements, such as routers.

Figure 4:
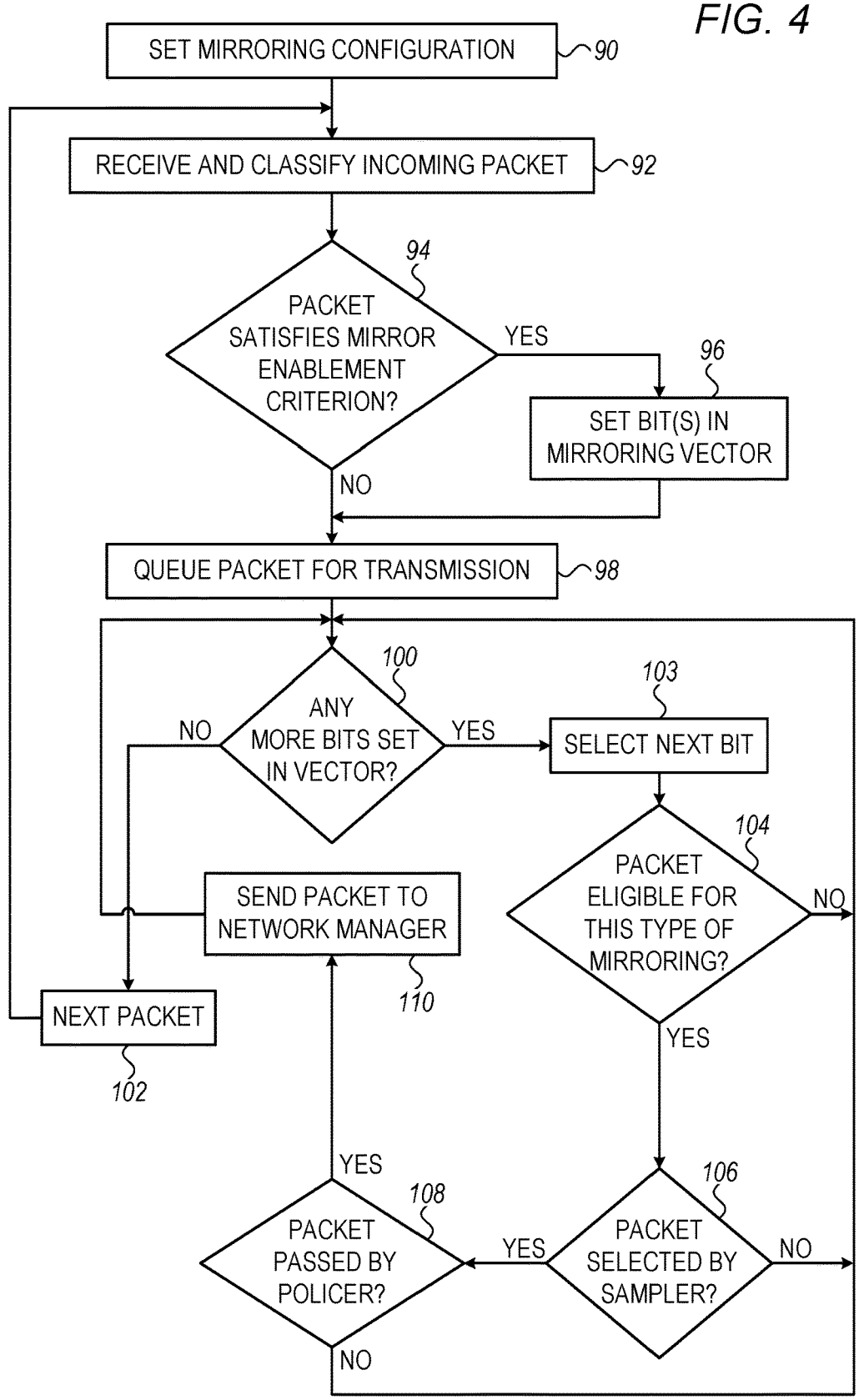
FIG. 4 is a flow chart that schematically illustrates a method for selective mirroring, in accordance with an embodiment that is described herein.

FIG. 4 is a flow chart that schematically illustrates a method for selective mirroring, in accordance with an embodiment that is described herein. The method is described, for the sake of concreteness and clarity, with reference to the elements of switch 32 that are shown in FIG. 3. Alternatively, however, this method may be applied, mutatis mutandis, in other sorts of network elements, which do not necessarily share the architectural features that are shown in FIG. 3.

As an initial step, network manager 38 sets the mirroring configuration of switch 32, at a configuration step 90. In this step, the network manager sets the flow characteristics to be applied by mirror enabler 80 in selecting candidate data flows for mirroring and the criteria to be used by sampler 82 in selecting the packets from these flows that will actually be mirrored to the network manager. As explained earlier, different sorts of flow characteristics (both bandwidth-related and otherwise) can be used in selecting the candidate flows, and each type of flow selection can be coupled with a different criterion or criteria for selecting packets to be sampled. Some examples are presented in the next section below. Manager 38 may also set other configuration parameters at this step, such as such as encapsulation for the mirrored packets (which may differ depending on mirroring criteria).

For each packet received through ingress port 40A, packet processing module 64 applies classification rules, at a packet classification step 92. At this stage, for example, flow detector 66 identifies the flow to which the packet belongs and updates its estimate of the bandwidth consumed by the flow. When the bandwidth exceeds a certain threshold (which may be preset by network manager 38 and/or updated adaptively), flow detector 66 labels the flow as an "elephant" flow, and notifies mirror enabler 80 accordingly. Additionally or alternatively, packet processing module 64 may pass other packet characteristics to mirror enabler 80, such as values of fields in the 5-tuple or quality-of-service parameters.

Mirror enabler 80 receives the flow characteristics from packet processing module 64 and checks whether the flow satisfies any of the criteria established for candidate flows, at a mirror enablement checking step 94. If so, enabler 80 marks the flow as a candidate for mirroring, at a marking step 96. The enabler may, for example, set a mirroring flag or vector in a respective descriptor that is associated with each packet in buffer 44. As explained earlier, when multiple criteria are available for mirroring, enabler 80 may set one or more bits of the mirroring vector for each candidate flow (or packets in the flow) to indicate which of the criteria was satisfied.

Packet processing module 64 queues the incoming packet in buffer 44, at a queuing step 98. Shared buffer manager 70, congestion detector 74 and latency measurement module 78 evaluate and update buffering parameters of the packets, as described above. Sampler 82 evaluates which packets are candidates for mirroring based on the bits in the mirroring vector, at a packet enablement testing step 100. If none of the bits are set for the flow to which this packet belongs (meaning that the flow is not a candidate for mirroring), sampler 82 skips on to the next packet, at an iteration step 102.

Assuming one or more of the bits in the mirroring vector are set, sampler 82 reads the next bit that is set, which indicates the mirroring criteria that are enabled for this packet, at a bit selection step 103. Sampler 82 considers these criteria in deciding whether the packet is eligible for mirroring, at an eligibility testing step 104. For example, packets in queues that are congested or are encountering high latency may be found eligible at step 104. Additionally or alternatively, sampler 82 may evaluate other mirroring criteria at this step. If the packet does not satisfy the mirroring criterion or criteria indicated by the current enablement bit, sampler 82 returns to step 100, and then proceeds to the next packet at step 102 if no further bits are set in the enablement vector. As explained above, a given packet is considered for mirroring only if the eligibility criterion or criteria (if any) that it meets are enabled for the particular flow to which the patent belongs.

If the current packet is found at step 104 to be eligible for mirroring, sampler 82 decides whether to select this packet for mirroring, at a sampling step 106. If the packet is selected for mirroring at step 106, policer 86 decides whether the packet should actually be sent to network manager 38, at a policing step 108. As explained above, sampler 82 or policer 86 may filter out the packet at this stage and not mirror it to the network manager, for example to prevent the rate of mirroring from exceeding a certain limit. Thus, if the decision at either step 106 or 108 is negative, the packet is not mirrored, and control returns to step 100.

If the enablement vector indicates that the mirroring criterion satisfied by the data packet is applicable to the flow to which the packet belongs, however, mirroring module 36 forwards a copy of the packet to network manager 38, at a mirroring transmission step 110. Control then returns to step 100. Thus, if a given packet satisfies multiple criteria for which mirroring are enabled, mirroring module may actually send multiple copies of the packet to network manager 38.

EXAMPLES

The following examples illustrate scenarios in which the techniques of two-stage mirroring selection that are described above can be usefully applied:

Mirroring of elephant flows that are causing congestion on a specific queue, multiple queues, or all queues. This information can help the network administrator to move elephant flows to less congested paths (for example, by moving some, but not all, of the elephant flows to alternative paths).

Elephant detection by flow detector 66 is enabled.

Mirror enabler 80 sets the mirroring vector to enable mirroring on elephant flows for mirroring type=congestion-based mirroring.

Sampler 82 is set for congestion-based mirroring on selected queues.

Mirroring of latency-sensitive traffic that is facing high latency.

Enabler 80 sets the mirroring vector to enable mirroring of flows having a specified value or values of quality of service for mirroring type=latency-based mirroring. Alternatively, the candidate flows may be selected due to being associated with specific applications identified by their Layer 4 source and/or destination ports.

Sampler 82 is set for latency-based mirroring on selected queues.

Mirroring of traffic addressed to a specific node 24 that is facing packet drop. This options enables fast detection of specific information that may be delayed by the network.

Enabler 80 sets the mirroring vector to enable mirroring of all traffic to a specified destination IP address for mirroring type=WRED and/or tail drop.

Sampler 82 is set for WRED and/or tail drop mirroring on a specified egress interface 40B or multiple interfaces.

Other examples will be apparent to those skilled in the art and are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:

multiple interfaces configured to be connected to a packet data network so as to serve as ingress and egress interfaces in receiving and forwarding of data packets from and to the network by the apparatus;

at least one memory coupled to the multiple interfaces and configured as a buffer to contain packets received through one or more of the multiple interfaces while awaiting transmission to the network via others of the multiple interfaces; and processing circuitry, which is configured to identify data flows to which the data packets that are received through the one or more of the multiple interfaces belong, to assess respective bandwidth characteristics of the data flows, and to select one or more of the data flows as candidate flows for mirroring responsively to the respective bandwidth characteristics, and which is further configured to select, responsively to one or more predefined mirroring criteria, one or more of the data packets in the candidate flows for analysis by a network manager, and to send the selected data packets to the network manager over the network via one of the multiple interfaces, wherein the one or more predefined mirroring criteria comprise a plurality of mirroring criteria, and wherein the processing circuitry is configured to label the data packets in the candidate flows so as to indicate which of the mirroring criteria are applicable to each of the labeled data packets, and to select a given data packet for mirroring in response to a given mirroring criterion only when the given data packet is labeled to indicate that the given mirroring criterion is applicable to the given data packet.

2. The apparatus according to claim 1, wherein the processing circuitry is configured to mirror the data packets only from the candidate flows, while the data packets in the data flows that were not selected as candidate flows are not mirrored.

3. The apparatus according to claim 1, wherein none of the data packets in the candidate flows are sent to the network manager when the mirroring criteria are not satisfied.

4. The apparatus according to claim 1, wherein the processing circuitry is configured to select the data flows that consume respective bandwidths in excess of a specified threshold as the candidate flows, while the data flows that consume respective bandwidths less than the specified threshold are not selected.

5. The apparatus according to claim 1, wherein the processing circuitry is configured to label the data packets in the candidate flows as candidates for mirroring upon receipt of the data packets through the one or more of the multiple interfaces, before queuing the data packets in the buffer, and to select the data packets for analysis from among the labeled data packets that are held in the buffer.

6. The apparatus according to claim 1, wherein the processing circuitry is configured to select one or more further candidate flows responsively to values of one or more fields in a header of the data packets.

7. The apparatus according to claim 1, wherein the processing circuitry is configured to apply the one or more predefined mirroring criteria by monitoring a respective buffering parameter of the data packets in the candidate flows that have been queued in the buffer while awaiting transmission via the others of the multiple interfaces, and to select the one or more of the data packets for mirroring based on the respective buffering parameter.

8. The apparatus according to claim 7, wherein the buffering parameter specifies at least one transmission characteristic of the candidate flows, selected from a group of transmission characteristics consisting of a degradation in quality of service, a level of buffer usage, a queue length, a packet transmission latency, and a congestion state.

9. Communication apparatus, comprising:
multiple interfaces configured to be connected to a packet data network so as to serve as ingress and egress interfaces in receiving and forwarding of data packets from and to the network by the apparatus;
at least one memory coupled to the multiple interfaces and configured as a buffer to contain packets received through one or more of the multiple interfaces while awaiting transmission to the network via others of the multiple interfaces; and
processing circuitry, which is configured to identify data flows to which the data packets that are received through the one or more of the multiple interfaces belong, to select and label one or more of the data flows as candidate flows for mirroring upon receipt of the data packets through the ingress interfaces and before queuing the data packets in the buffer, and which is further configured to select for analysis by a network manager, responsively to one or more predefined mirroring criteria, one or more of the data packets in the candidate flows from among the data packets that are held in the buffer, and to send the selected data packets to the network manager over the network via one of the multiple interfaces,
wherein the one or more predefined mirroring criteria comprise a plurality of mirroring criteria, and wherein the processing circuitry is configured to label the data packets in the candidate flows so as to indicate which of the mirroring criteria are applicable to each of the labeled data packets, and to select a given data packet for mirroring in response to a given mirroring criterion only when the given data packet is labeled to indicate that the given mirroring criterion is applicable to the given data packet.

10. The apparatus according to claim 9, wherein none of the data packets in a given candidate flow are sent to the network manager when the mirroring criterion applicable to the given candidate flow is not satisfied.

11. The apparatus according to claim 9, wherein the processing circuitry is configured to mirror the data packets only from the candidate flows, while the data packets in the data flows that were not selected as candidate flows are not mirrored.

12. A method for communication, comprising:
receiving and forwarding of data packets from and to a packet data network via ingress and egress interfaces of a network element;
identifying data flows to which the data packets that are received through the ingress interfaces belong;
assessing respective bandwidth characteristics of the data flows;
selecting one or more of the data flows as candidate flows for mirroring responsively to the respective bandwidth characteristics;
selecting, responsively to one or more predefined mirroring criteria, one or more of the data packets in the candidate flows for analysis by a network manager; and
sending the selected data packets to the network manager over the network via one of the egress interfaces,
wherein the one or more predefined mirroring criteria comprise a plurality of mirroring criteria, and wherein selecting the one or more of the data flows comprises labeling the data packets in the candidate flows so as to indicate which of the mirroring criteria are applicable to each of the labeled data packets, and wherein selecting the one or more of the data packets comprises choosing a given data packet for mirroring in response to a given mirroring criterion only when the given data packet is labeled to indicate that the given mirroring criterion is applicable to the given data packet.

13. The method according to claim 12, wherein selecting the one or more of the data packets comprises mirroring the data packets only from the candidate flows, while the data packets in the data flows that were not selected as candidate flows are not mirrored.

14. The method according to claim 12, wherein none of the data packets in the candidate flows are sent to the network manager when the mirroring criteria are not satisfied.

15. The method according to claim 12, wherein selecting the one or more of the data flows comprises selecting the data flows that consume respective bandwidths in excess of a specified threshold as the candidate flows, while the data flows that consume respective bandwidths less than the specified threshold are not selected.

16. The method according to claim 12, wherein selecting the one or more of the data flows comprises labeling the data packets in the candidate flows as candidates for mirroring upon receipt of the data packets through the ingress interfaces, before queuing the data packets in the buffer, and wherein selecting the one or more of the data packets comprises choosing the data packets for analysis from among the labeled data packets that are held in the buffer.

17. The method according to claim 12, wherein selecting the one or more of the data flows comprises selecting one or more further candidate flows responsively to values of one or more fields in a header of the data packets.

18. The method according to claim 12, wherein selecting the one or more of the data packets comprises applying the one or more predefined mirroring criteria by monitoring a respective buffering parameter of the data packets in the candidate flows that have been queued in the buffer while awaiting transmission via the egress interfaces, choosing the one or more of the data packets for mirroring based on the respective buffering parameter.

19. The method according to claim 18, wherein the buffering parameter specifies at least one transmission characteristic of the candidate flows, selected from a group of transmission characteristics consisting of a degradation in quality of service, a level of buffer usage, a queue length, a packet transmission latency, and a congestion state.

\* \* \* \* \*